S. GRIFFITHS.
SHOCK ABSORBING SPRING.
APPLICATION FILED SEPT. 20, 1917.
1,275,247.
Patented Aug. 13, 1918.
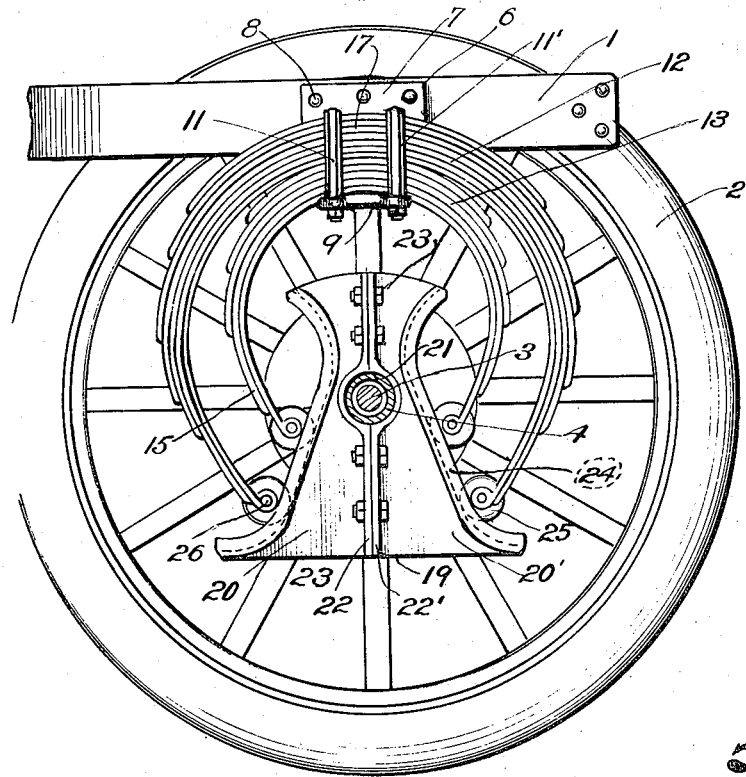
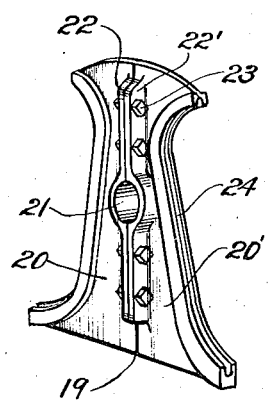
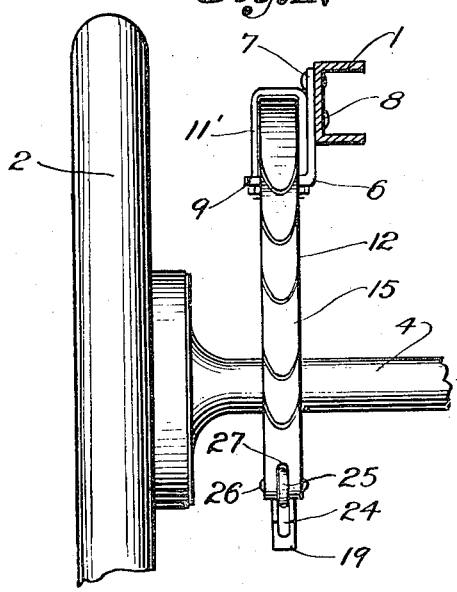
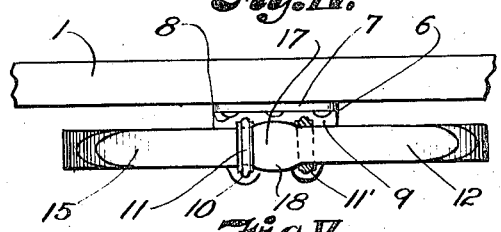
INVENTOR.
Samuel Griffiths.
BY Arthur C. Brown
ATTORNEY

UNITED STATES PATENT OFFICE.

SAMUEL GRIFFITHS, OF KANSAS CITY, KANSAS.

SHOCK-ABSORBING SPRING.

1,275,247.      Specification of Letters Patent.      Patented Aug. 13, 1918.

Application filed September 20, 1917. Serial No. 192,398.

*To all whom it may concern:*

Be it known that I, SAMUEL GRIFFITHS, a citizen of the United States, residing at Kansas City, in the county of Wyandotte and State of Kansas, have invented certain new and useful Improvements in Shock-Absorbing Springs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to shock absorbing springs, and has for its principal object to provide a device of this character wherein expansion and contraction of the spring members is made more gradual than is ordinarily accomplished, so that all shock or jar incidental to travel, is practically eliminated and an easy riding vehicle provided.

In accomplishing these objects, I have provided improved details of structure, the preferred forms of which are illustrated in the accompanying drawings, wherein:

Figure I is a side elevation of a vehicle spring constructed according to the present invention, illustrating its application to the axle and body frame of an automobile.

Fig. II is an end view of the same parts.

Fig. III is a detail perspective view of an axle block, particularly illustrating the grooved guideway.

Fig. IV is a plan view of the spring, illustrating its attachment to the body frame.

Fig. V is a perspective view of one of the spring members, particularly illustrating its locking head.

Referring more in detail to the drawings:

1 designates one of the longitudinal side members of a vehicle frame, 2 a ground wheel, 3 a revoluble axle on which the wheel 2 is mounted and 4 a housing inclosing the axle 3; all of which parts are of the usual construction as applied to automobiles, or like vehicles.

Fixed to the frame member 1, is a spring mounting shoe 6, comprising a vertical back plate 7 through which bolts, or the like, 8 are projected to attach the shoe to the frame member and turned laterally and inwardly therefrom is a base plate 9 having paired apertures 10 adjacent its opposite sides for receiving U-bolts 11—11', whereby upper and lower spring sections 12—13 are supported upon and securely attached to the shoe.

The spring sections 12—13 are somewhat circular in form, each being built up of a plurality of arcuate spring metal members 15, placed one upon the other and each being shorter than the one below it, so that at the base or center the sections are of substantial thickness to withstand all the strain that may be placed thereon, while their ends are more flexible.

At their centers, each of the spring members is provided with a head 17, formed by extending wings 18 from each side of the members; the said heads being adapted to seat snugly between the U-bolts to retain the members all in their functional relation to each other and which hold the sections in position in the mounting shoe.

In mounting the spring sections on the body, the section 13 is inclosed within the section 12 and both are tightly clamped together and to the shoe at their bases by U-bolts 11—11', so that the ends of the sections extend downwardly and curve inwardly in a vertical plane that is perpendicular to the axle 3.

Fixed to the axle housing 4, perpendicularly below the shoe 6, is a spring supporting block 19 comprising oppositely paired sections 20—20' provided at adjacent edges with registering semi-circular sockets 21, adapted to fit about the housing 4 and flanges 22—22' for receiving bolts 23, whereby the sections may be bolted together about the axle. Each of the block sections is provided with an outwardly and downwardly sloping side edge having a guide groove 24 therein wherein rollers 25, mounted at the free ends of the spring sections 12—13 are adapted for guided travel; the said rollers being mounted on cross pins 26 fixed at the ends of the spring sections and are revoluble within slots 27 cut therein.

Adjacent the upper and lower ends of the block 16 the grooved edges are curved sharply outwardly so that the upward and downward movement of the rollers thereaalong is limited but, as the curve at each end is gradual, there will be no jolt should the springs be moved suddenly to either their upper or lower limit.

With the parts so constructed and assembled, it is apparent that the inward tension of the springs may be so adjusted that under normal load the rollers will rest in the grooves at the upper end of the block and that as the load is increased the springs will spread and move downwardly along the sides of the block, and that any sudden jar, incidental to travel over a rough road, is relieved by the yieldability of the springs.

It is also apparent that the springs not only provide a certain resiliency by their vertical movement relative to the blocks 16, but being of spring metal would also permit a certain amount of resiliency should the ends be fixed to the block.

It is apparent that by curving the grooved side faces of the blocks outwardly at their lower and upper ends the movement of the springs to their opposite limits will be gradual and a jolt sufficient to move the springs to either of such limits will be practically unfelt.

Having thus described my invention, what I claim as new therein, and desire to secure by Letters-Patent, is:

1. In combination with a vehicle body and a supporting axle, a block attached to the axle having inclined opposite edges, and a spring fixed to the vehicle body and having yieldable ends adapted for travel along the inclined edges of the block.

2. In combination with a vehicle body and a supporting axle, a block attached to the axle having outwardly and downwardly inclined side edges, a spring leaf of practically circular form attached to the body and having rollers at its ends adapted for guided travel along the inclined edges of the block, for the purpose set forth.

3. In combination with a vehicle body and a supporting axle, a block attached to the axle having outwardly and downwardly inclined side edges, a spring leaf of practically circular form attached to the body having rollers at its ends adapted for guided travel along the opposite inclined edges of the block and means for resisting travel of the rollers.

4. In combination with a vehicle body and a supporting axle, a block mounted on the axle having outwardly and downwardly inclined side edges curved outwardly at the upper and lower ends and provided with edge grooves, a spring leaf of practically circular form attached at its center to the body and rollers at the opposite ends of said leaf adapted for guided travel along the opposite grooved edges of said block, for the purpose set forth.

5. In combination with a vehicle body and a supporting axle, a block mounted on said axle comprising opposite outwardly and downwardly inclined side walls curved outwardly at their upper and lower ends and having grooves extending therealong, and spring leaves of practically circular form attached at their center, one within the other, to the vehicle body and having rollers at their opposite ends adapted for guided travel along the grooved edges of the said block, for the purpose set forth.

6. In combination with a vehicle body and a supporting axle, of a block comprising paired sections bolted together to inclose said axle, each of said sections having an outwardly and downwardly inclined edge curved outwardly at its upper and lower ends and having a groove therealong, a shoe attached to said body, spring leaves of practically circular form attached at their centers to said shoe, one of said springs being smaller than the other and contained therein, and rollers mounted at the ends of said spring leaves adapted for guided travel along the opposite grooved edges of the said block.

In testimony whereof I affix my signature.

SAMUEL GRIFFITHS.